United States Patent [19]
Beckman et al.

[11] Patent Number: 5,273,482
[45] Date of Patent: Dec. 28, 1993

[54] REINFORCED CASINGS FOR PREPARING DIMENSIONALLY UNIFORM PROCESSED FOOD PRODUCTS WITH FLAT ENDS

[75] Inventors: John H. Beckman, 135 Whitefawn Trail, Downers Grove, Ill. 60516; Thomas R. Stanley, Kansas City, Mo.; Ronald S. Kearby, Williamsport, Ind.; Ralph R. Shelley, Danville, Ill.

[73] Assignee: John H. Beckman, Downers Grove, Ill.

[21] Appl. No.: 982,027

[22] Filed: Nov. 24, 1992

Related U.S. Application Data

[63] Continuation of Ser. No. 714,189, Jun. 12, 1991, abandoned.

[51] Int. Cl.⁵ .................. A22C 11/00; F16L 11/08
[52] U.S. Cl. ........................ 452/39; 452/35; 452/37; 138/118.1
[58] Field of Search .......... 452/39, 38, 37, 32; 138/118.1; 426/105, 135; 428/34.8

[56] References Cited

U.S. PATENT DOCUMENTS

| | | | |
|---|---|---|---|
| 1,874,453 | 8/1932 | Comer | 452/38 |
| 2,669,749 | 2/1954 | Hovland | 452/38 |
| 2,937,095 | 5/1960 | Zitin | 452/39 |
| 3,233,281 | 2/1966 | Swift | 452/35 |
| 3,480,449 | 11/1969 | Sumption | 452/38 |
| 3,524,297 | 8/1970 | Falborg et al. | 53/22 |
| 3,650,774 | 3/1972 | Beth et al. | 452/38 |
| 3,777,331 | 12/1973 | Falborg | 53/124 E |
| 3,808,638 | 5/1974 | Kupcikevicius et al. | 452/39 |
| 4,007,761 | 2/1977 | Beckman | 452/38 |
| 4,013,099 | 3/1977 | Gerick et al. | 138/118.1 |
| 4,028,775 | 6/1977 | Tysver | 452/38 |
| 4,033,382 | 7/1977 | Eichin | 138/118.1 |
| 4,064,673 | 12/1977 | Gerick et al. | 452/21 |
| 4,132,047 | 1/1979 | Gerick et al. | 452/21 |
| 4,160,305 | 7/1979 | Tysver | 452/38 |
| 4,325,413 | 4/1982 | Lenhart et al. | 138/118.1 |
| 4,327,777 | 5/1982 | Michel et al. | 452/21 |
| 4,422,215 | 12/1983 | Liekens et al. | 138/118.1 |
| 4,466,465 | 8/1984 | Frey | 138/118.1 |
| 4,466,466 | 8/1984 | Raudys | 138/118.1 |
| 4,466,984 | 8/1984 | Kupcikevicius et al. | 138/118.1 |
| 4,484,679 | 11/1984 | Liekens et al. | 138/118.1 |
| 4,525,895 | 7/1985 | Raudys | 452/39 |
| 4,551,884 | 11/1985 | Kupcikevicius et al. | 452/35 |
| 4,562,617 | 1/1986 | Kollross | 452/39 |
| 4,610,742 | 9/1986 | Rop et al. | 138/118.1 |
| 4,621,392 | 11/1986 | Raudys | 452/39 |
| 4,641,687 | 2/1987 | Kupcikevicius | 452/39 |
| 4,736,775 | 4/1988 | Oxley | 138/118.1 |
| 4,803,757 | 2/1989 | Raudys | 452/38 |
| 4,842,022 | 6/1989 | Oxley et al. | 138/118.1 |
| 5,003,666 | 4/1991 | Stall et al. | 452/21 |
| 5,027,863 | 7/1991 | Kupcikevicius | 138/118.1 |
| 5,038,832 | 8/1991 | Mahoney et al. | 452/38 |

FOREIGN PATENT DOCUMENTS

| | | |
|---|---|---|
| 0181551 | 10/1985 | European Pat. Off. |
| 2035268 | 4/1971 | Fed. Rep. of Germany |
| 436635 | 4/1912 | France |
| 6604085 | 10/1966 | Netherlands |

*Primary Examiner*—Willis Little
*Attorney, Agent, or Firm*—McAndrews, Held & Malloy

[57] ABSTRACT

Tubular food casings for preparing dimensionally uniform processed meat products with flat ends for maximizing yields for prepackaged product. Casings reinforced with one or more narrow polymeric bands securely bonded to the terminal ends of casing units are able to receive flat end plates which cooperate with the bands to form reliable end closures without clips and minimal casing requirements.

39 Claims, 3 Drawing Sheets

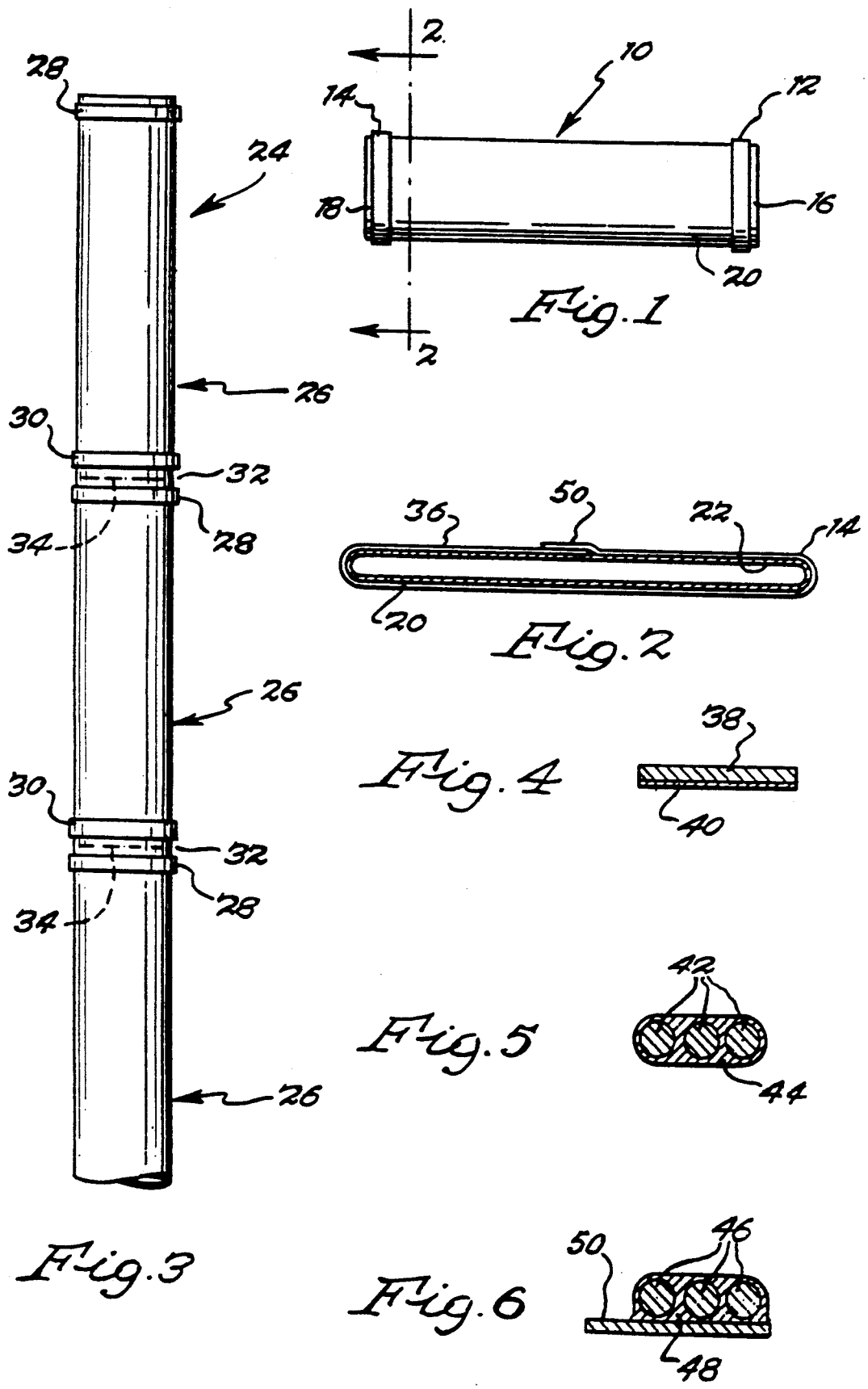

REINFORCED CASINGS FOR PREPARING DIMENSIONALLY UNIFORM PROCESSED FOOD PRODUCTS WITH FLAT ENDS

This is a continuation of application Ser. No. 07/714,189 filed Jun. 12, 1991 now abandoned.

BACKGROUND OF THE INVENTION

The present invention relates to improved casings for packaging food products, and more specifically, to specially reinforced casings for preparing dimensionally uniform processed meat products for presliced packaging with minimal waste.

In the manufacture of sausage products, meat emulsion is prepared from comminuted meat together with fillers, seasonings, spices, etc. A tubular food casing, such as one containing non-edible cellulose, is loaded onto the stuffing horn of a filling machine and stuffed with the meat emulsion. In the case of small sausage products, like frankfurters, the filled casings are twisted, tied or clipped into suitable links at predetermined intervals and further processed. For larger sausage products, like bologna, salami, and the like, the meat emulsion is introduced into larger heavier walled casings or casings having fibrous reinforcements, and formed into chubs or lengthy individual sausage sticks or logs. The manufacture of other types of processed meats is carried out using the same general method.

In preparing larger diameter processed meat products, like bologna, an important consideration is the maintenance of accurate size control over the entire length of the log. It is important that the diameter of larger products be controlled very carefully so meat packers are able to cut the log into slices of predetermined thickness and diameter for prepackaging. The objective is to have a given number of slices weigh a precise predetermined amount for each package. That is to say, a given number of slices should weigh exactly one pound or some other preselected weight. In addition, precise diameter control alone is important for vacuumized packages where the product must support the package and where varying diameters would be objectionable.

A further important consideration in the preparation of larger diameter processed meat products for prepackaging concerns end portions. Processed logs having either rounded or tapered ends provide poor yields. The end portions of a bologna, for example, which are normally rounded and which may also be tapered can result in the loss of several inches of meat from each end of the sausage. Significantly undersized sliced product is not usable in most vacuumized display packages and must be reworked at significant cost.

In an effort to maximize yields of sliced product for prepackaging, methods have been developed for eliminating rounded and undersized ends. One popular approach to this problem has been to prepare cylindrically shaped sausage products having flattened ends by utilizing a variety of methods and apparatus. While such attempts have attained some degree of success, none has proven to be entirely satisfactory.

For example, U.S. Pat. No. 3,777,331 discloses means for preparing sausage products with flat ends in which the meat mass is placed in a loading chamber having an undersized flat end plate at each end. The meat mass is compressed and extruded from the chamber and through a stuffing horn with one end plate at each end of the meat mass. A continuous length of tubular casing is filled with successive charges of the meat mass and end plates by transporting the free end of the casing with a conveyor onto the end of the horn from which the charges of meat mass are extruded. The casing end is clamped onto the stuffing horn and the conveyor retracted to its starting position whereupon the meat mass and end plates are extruded into the casing. Because the end plates and meat mass pass through the inside of the stuffing horn while the casing is clamped on the outside of the horn the casing has the potential for a relatively loose fit over the encased meat product and end plates. This is undesirable because of possible "fat-out" and jelly pocket formation from an accumulation of water with fat and/or gelatin. Such products have an unappetizing appearance, and consequently, have poor customer acceptance. The casing of U.S. Pat. No. 3,777,331 must be stretched substantially to prevent fat out, etc., which can result in tapering of each product end as it approaches the end plates which are no larger, and slightly less than the diameter of the unstretched casing.

Other representative examples of means for preparing dimensionally uniform encased sausage products with flat ends are disclosed by U.S. Pat. No. 4,551,884 and 4,466,465, both of which employ elaborate end plate assemblies having central openings which are costly to fabricate. These end plates, called "flattening annular disks" require a central opening because they are mounted on the end of the stuffing horn. The hole, however, makes it necessary to gather the casing over the face of the disk and apply a clip to close the opening and avoid loss of meat emulsion during filling. However, this is not enough to prevent substantial loss of emulsion pressed through the hole during stuffing which fills the space between the disk and the gathered and clipped casing. Consequently, it is necessary to use a thin tubular film connecting the disks.

Accordingly, it would be highly desirable to have an improved system of casings for meat products, including those which are suitable for filling with whole muscle and chunk style products to produce dimensionally uniform products, and which have flat ends to maximize yields of sliced product for prepackaging. This would especially include large size fibrous cellulose casings.

SUMMARY OF THE INVENTION

It is therefore a principal object of the invention to provide food casings having a tubular body with interior and exterior surfaces, first and second terminal ends, and at least one casing reinforcing band disposed coaxially around the tubular body and bonded to the exterior surface. The banded casings are adapted to receive low cost end plates or disks in the casing interior at each terminal end of a casing unit having such a reinforcing band. The reinforced banded casings in combination with the end plates are especially useful in providing encased food products with flat ends. Accordingly, the improved casings fulfill the objective of eliminating rounded and tapered ends on processed meat products for presliced packaging.

It is yet a further object of the invention to provide for more economical use of food casing by reducing or eliminating the need for extra lengths of casing and clips required with earlier end closure systems in preparing flat ended encased processed meat products. The elimination of end closure clips also avoids exposure of operators to safety hazards associated with casing clippers.

Because the system of specially reinforced casing and end plates are not dependent on the passage of meat product through openings in the end plates/disks the system is also adaptable for stuffing whole muscle type meat products, e.g. whole boneless hams, sectional and formed hams.

End plates which may be circular in shape preferably have a diameter about equal to that of the stuffed diameter of the casing are positioned in the casing interior adjacent to the reinforcing band(s) in a plane normal to the longitudinal axis of the casing. The improved casings with reinforcing bands affixed to the terminal end portions of the casing are sufficiently flexible and stretchable to permit insertion of such end plates into the interior of the casing for positioning adjacent to the reinforcing bands. The bands also have sufficient holding strength to restrain the terminal ends of the casing from being drawn over the end plates after the casing has been filled. Accordingly, the novel reinforced casings when employed in combination with end plates provide a secure and reliable end closure mechanism for preparing cylindrically shaped stuffed meat products which are dimensionally uniform end-to-end, while also providing flat end portions for maximizing yields. This is especially advantageous for prepackaged sliced meat products.

It is yet a further principal object of the invention to provide fibrous cellulose food casings, large size non-fibrous cellulose food casings with the reinforcing band(s) affixed to the exterior surface of the casings, as well as other banded casings fabricated from other polymeric films, such as polyesters, nylons, PVDC and other saran type polymers, PVA, and copolymers, co-extrusions and laminates comprising these resins. Such casings may consist of cut lengths or units of casing for stuffing at least one processed food product at a time. Likewise, the present invention contemplates continuous casings wound on a reel or continuous casings folded in a container with the foregoing reinforcing bands/rings designating individual casing units connected together and adapted for continuous and automatic filling operations. This is especially the case with continuous lengths of food casing with repeating casing units having a gap between each second casing reinforcing band of a leading casing unit and the first casing reinforcing band of the next adjacent casing unit, and so on.

It is yet a further principal object of the invention to provide methods for preparing banded food casings, and particularly casings for processed meat for receiving flat end plates for purposes of forming end closures and dimensionally uniform food products having flat ends. The methods include the steps of:

(a) providing a food casing having a tubular body with interior and exterior surfaces and first and second terminal ends;

(b) providing at least one strip of sufficient length to coaxially encircle the casing prior to being filled, (c) positioning at least one of the strips coaxially around the tubular body proximate to at least one of the casing terminal ends, and (d) bonding the strip to the exterior surface of the casing to form a reinforcing band.

It is yet a further object to provide methods of making reinforced food casings by the steps of:

(a) providing a food casing having a tubular body with interior and exterior surfaces and first and second terminal ends, and (b) applying coaxially around the tubular body at least one strip of an adhesive or polymer to form a reinforcing band on the casing proximate to at least one of the terminal ends.

DESCRIPTION OF THE DRAWINGS

For a further understanding of the invention as well as its characterizing features reference should now be made to the accompanying drawings, wherein:

FIG. 1 is a side elevational view of a cut length of food casing with reinforcing bands adjacent to each terminal end.

FIG. 2 is a sectional view of a casing taken along line 2—2 of FIG. 1.

FIG. 3 is a section of a continuous casing having repeating reinforced casing units like those of FIG. 1.

FIG. 4 is an enlarged sectional view of a preferred strip used in preparing the reinforced banded food casings.

FIGS. 5 and 6 are enlarged sectional views of alternative embodiments of preformed strips used in making the banded food casings.

DETAILED DESCRIPTION OF THE INVENTION

Figure 7:
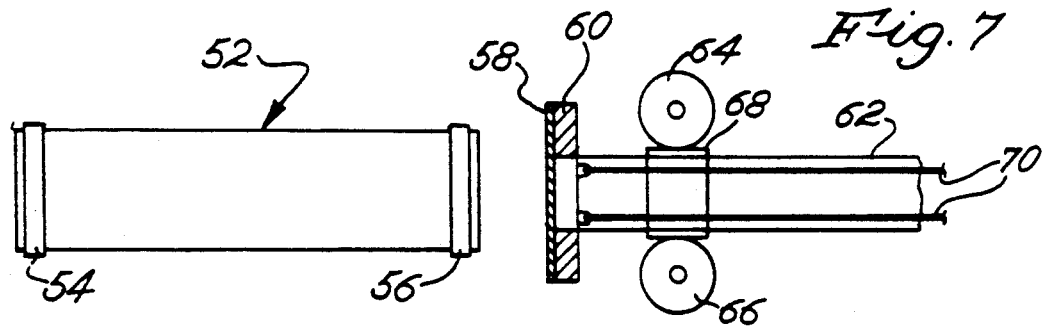
FIGS. 7-13 are diagrammatic views showing a sequence of steps which can be performed in stuffing the banded sausage casings.

The tubular food casings disclosed herein relate principally to large size food casings manufactured from materials like regenerated cellulose or regenerated cellulose supported by a fibrous web, such as hemp paper. Such casings are commonly referred to as large cellulose casings and fibrous casings, respectively. These casings are employed in the manufacture of large sausage and meat products, such as cooked salami and bologna, chunked and formed ham, chicken and turkey, cooked and smoked ham butts, and the like.

While large cellulose casings and fibrous cellulose casings, including coated fibrous type casings are most widely used and preferred, this invention is also intended to include other nonedible food grade type polymeric casings, such as those comprised of polyvinylidene chloride (PVDC), nylon and polyester. In addition, this invention also contemplates co-extruded type casings prepared with more then one type of polymeric film. The casings prepared according to this invention may also be manufactured from films having commonly used internal and external treatments, coatings and impregnations, e.g. meat release agents, meat bonding agents, as well as plasticizers and humectants, various levels of moisture, including premoisturized, ready-to-fill/no-soak type casings and those having additives, such as antimycotic agents and liquid smoke.

Turning first to FIG. 1, there is shown a predetermined cut length of tubular food casing formed into a reinforced casing unit 10 according to this invention with casing reinforcing bands 12 and 14 adjacent to first and second terminal ends 16 and 18. In addition to terminal ends 16 and 18, casing unit 10 includes exterior surface 20 and interior surface 22 (FIG. 2). Reinforcing bands 12 and 14 are bonded to exterior surface 20, which bands and methods of bonding are discussed in greater detail below. The reinforced casing units may be produced in any size, but are most economically advantageous in stuffed diameters ranging from about 70 mm to about 200 mm and larger, and in lengths ranging from about 14 to about 72 inches, and even longer.

While the reinforced banded casing unit of FIG. 1 is illustrated with the more preferred pair of spaced reinforcing bands affixed to the tubular body adjacent to each end of the casing for preparing dimensionally uniform meat products having flat ends, it should be understood this invention contemplates embodiments wherein a single reinforcing band is employed, usually positioned proximate to one end of the casing unit. That end of the casing having the reinforcing band is closed by insertion into the bore of the casing a relatively thin disk or circular end plate which fits into the casing normal to the longitudinal axis. Because the diameter of the end plate is larger than the diameter of the reinforcing band and unstretched casing, the casing will not be drawn over the end plate when filled to its stretched condition and further processed. The opposite terminal end of the casing can also have a reinforcing band affixed thereto in a similar manner and closed with an end plate after being stuffed. A casing with a single reinforcing band is filled from the end without the band and closed by gathering the casing and applying a metal clip to the gathered casing using commonly known methods.

While flat and folded widths of large size casing up to about 6 feet in length are commonly used, a more recent trend has been to prepare long lengths of casing for winding on a reel for continuous filling operations. Reels may hold lengths of casing in the range of 1500 feet or more. FIG. 3 shows a portion of banded casing 24 according to this invention for use as reel stock. This consists of repeating casing units 26 in sequence along the continuing length of casing. That is, the reel stock may consist of a continuous length of a large size casing having repeating first and second reinforcing bands 28, 30, respectively, coaxially wound around the tubular body and bonded to the exterior surface of an uncut length of casing at predetermined intervals. Accordingly, from this disclosure it will be recognized it is unnecessary to determine the length of the final filled product before affixing the reinforcing bands to the casing. Once affixed to the casing the distance between bands will determine the length of the product when the casing is filled.

As a preferred embodiment, repeating banded casing units as illustrated by FIG. 3 have a gap 32 between each second casing reinforcing band 30 of a leading casing unit and first casing reinforcing band 28 of the adjacent trailing casing unit. Gaps 32 provide desired space for severing individual casing units from the length of reel stock during stuffing. As an additional feature, the casing in gap 32 may have scoring 34 which permits separation before or after filling of casing unit 26 without requiring potentially hazardous cutting means customarily employed in stuffing apparatus. The term "scoring" or "scored" is intended to mean a continuous or intermittent scratch or incision in the casing film allowing separation of individual casing units from the continuous length of casing by manual or mechanical means. Scoring 34 offers the added flexibility and convenience to the operator of being able to remove individual casing units even manually from the continuous length of casing.

As an optional feature gaps 32 can also provide a convenient point for splicing additional lengths of casing for more continuous filling operations. Butted or lapped joints between casing ends can be formed and sealed by casing splicing techniques known in the art for linking lengths of casings together.

Generally, the reinforcing bands 36 (FIG. 2) encircling the casing and bonded thereto consist of strong, flexible materials which can be firmly bonded to the exterior wall of the tubular casing so they are able to withstand food processing conditions, like prolonged elevated temperatures, salted hot water and hot animal fat associated with cooking cycles for meat products. That is, the bonded reinforcing bands should be strong and resistant to heat, moisture and oil, demonstrate good peel strength, and also possess a high tensile modulus, medium elongation and creep properties which are not excessively diminished as a result of high processing temperatures and humidity, and from exposure to hot water and fats. In actual use, the bonded reinforcing bands should have sufficient stretch properties to permit insertion of flat end plates into the interior of the casing for positioning adjacent to the reinforcing band in a plane normal to the longitudinal axis of the casing, and also return to a diameter sufficiently smaller than the end plates so as to rest next to them, while also having sufficient strength to restrain the terminal ends of the casing from being drawn over the end plates during and after the filling and cooking cycles. In essence, this means the reinforcing bands bonded to the casing may be stretched even beyond the periphery of the end plates inserted in the casings provided they also have sufficient memory and strength to remain in place during filling and subsequent processing steps.

The reinforcing bands contemplated by this invention should not be confused with the splicing tapes and methods of U.S. Pat. No. 4,610,742 which discloses means for connecting separate sections of casing together by first forming a joint with two severed casing ends followed by wrapping the joint with a heat sealable splicing tape in order to form a completed joint which is both stuffable and machinable. According to the methods of U.S. '742 the location of the taped splice is random with respect to the stuffed product and usually falls somewhere within the length of the stuffed product where it may produce undesirable effects requiring the processed meat product to be reworked. The methods of the U.S. patent require the splicing tape to overlap so as to engage with the terminal ends of both casings being spliced together. According to the '742 patent this requires tapes having widths ranging from 1 to 4 inches.

In contradistinction, the reinforcing bands 36 of this invention are narrower strips having widths ranging from about 3/16 to about ½ inch, or somewhat wider, but substantially less than 1.0 inch, with about 3/16 to about ⅜ inch being most preferred. This permits the full band width with its underlying casing to lie flat against the end plate of the casing after the cooking cycle. While greater width reinforcing bands can be used, they serve no useful purpose, as the added width which does not lie flat does so because it carries none of the tensile forces of the casing. The reinforcing bands of this invention do not overlap and engage the terminal ends of two casing units. The expression "casing unit" is intended to mean a length of tubular packaging film which is dimensionally sufficient for packaging one desired length of a processed meat product, e.g. salami, bologna. Thus, for purposes of this invention expressions like "casing reinforcing band" and "proximate to a terminal end" or similar expressions are intended to mean reinforcing bands positioned so as to engage one casing unit without the same band or strip overlapping with an adjacent but separate casing unit.

A further important difference between the novel casings of this invention from those of U.S. Pat. No. 4,610,742 is the reinforcing bands of the former are normally applied to unbroken, continuous lengths of casing, and thus serve no splicing function. While a few splices may be required in 1500 foot length reels of casing, they are made in gap 32 (FIG. 3) between adjacent reinforcing bands. This provides a significant economic advantage over the concepts of the '749 patent because with the immediate invention there is no meat product rework requirement due to splices falling within the body of the food product.

Figure 14:
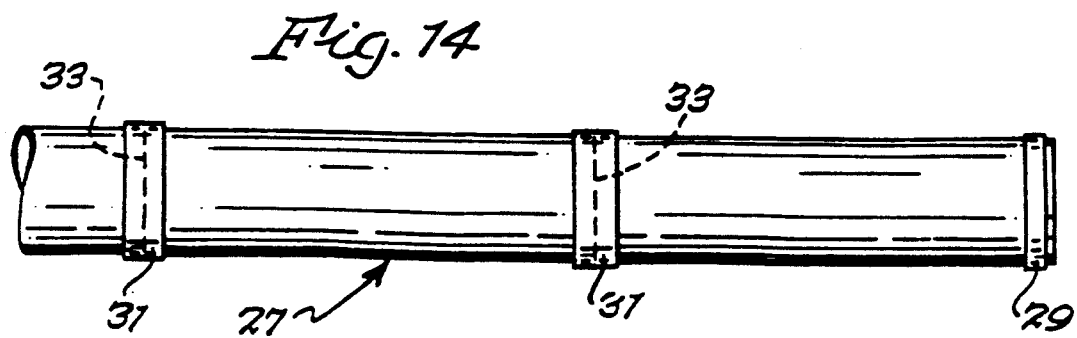
FIG. 14 is a section of a continuous length of casing with double bands.

As a further embodiment, the present invention contemplates casings having double width reinforcing bands (FIG. 14) applied to continuous lengths of reel stock casing rather than two separate, adjacent bands (FIG. 3). FIG. 14 shows a portion of a continuous casing 27 with a first or terminal band 29 having a regular width as described hereinabove, namely a band having a width ranging from about 3/16 to ½ inch, with about 3/16 to ⅜ inch being preferred. Subsequent bands of the continuous casing can be double bands 31 spaced at predetermined lengths. Double bands have widths which are substantially twice the width of regular width bands 29. That is to say, double bands 31 are approximately ⅜ to 1 inch in width, and more preferably from about ⅜ to about ¾ inch wide. Optionally, the double width bands and underlying casing can have scoring 33 for more convenient separation of individual casing units during the stuffing process. Alternatively, the double width bands and casing can be severed by cutting during the stuffing process using conventional means. The application of double width bands to continuous casings offers a significant economic benefit in the production of casings according to methods disclosed herein, since the process of applying only a single band rather then two separate narrower spaced bands can reduce production time and labor costs.

The reinforcing bands of this invention, both regular and double width bands, may take the form of a solid, continuous relatively narrow strip of fibrous cellulose or other suitable polymeric material 38 (FIG. 4—end view) as a supporting base with an adhesive coating 40, at least on one side. Such strips have a thickness ranging from about 4 to about 10 mil with 5 mil being most preferred for smaller code casings because they more readily crease at the edges. This is desirable when applying bands to flat casings without inflating. Thicker strips, i.e. 10 mil, may be used as reinforcing bands for larger code casings.

Alternative reinforcing bands according to the present invention are also shown in FIGS. 5-6. Instead of a solid polymeric film strip 38 consisting of a supporting base and adhesive applied thereto a multiplicity of reinforcing cords 42, for example, can be embedded in an adhesive or other type of adherent polymer-containing matrix 44 to form composite type strips for bonding to the exterior wall of the casing. A further embodiment of a composite type reinforcing strip is that shown in FIG. 6 where multiple cords 46 are embedded in a polymeric matrix 48 and affixed to a solid polymeric film base strip member 50 before bonding to a casing exterior. The embodiment of FIG. 6 preferably has cords 46 displaced to one edge of strip 50. That edge of the preformed composite strip preferably has the edge with cords 46 in closest proximity to the terminal end of the casing (not shown).

As described above, the materials employed as bonded reinforcing bands for casings of this invention can be made from preformed strips comprising various polymers. This means solid polymeric film strips, including strips of fibrous regenerated cellulose, for example, as supporting bases. In the case of the latter the strips can be prepared from cellulose food casings severed into strips dimensionally within the size ranges of materials anticipated by the embodiment of FIG. 4. Composite type preformed strips prepared from a multiplicity of strands held in a polymeric/adhesive matrix like those of FIGS. 5-6 are also useful.

While cords have been specifically illustrated as being a useful type of reinforcement for preformed composite strip materials (FIGS. 5-6), the present invention also contemplates other synthetic and natural materials especially for the composite-type reinforcing rings. That is, instead of polymeric cords, e.g. polyesters or natural and synthetic materials, fibers and filaments can be used. They can be bonded together in a polymeric or adhesive matrix and used as a composite type reinforcing band according to this invention.

The reinforcing bands can be fabricated from a wide range of polymeric materials which are available in film form. Especially preferred films are those which retain their strength at elevated temperatures (200° F.) in a high moisture environment, are resistant to animal fats at elevated temperatures, possess good bonding characteristics, and a short term (1 second) elongation (20%) without break, and not more than 6% set upon release of load. Representative examples of such materials are the polyesters like PET (polyethylene terephthalate), and especially oriented PET. This would include such grades of plastic film available from DuPont under the Mylar trademark, and particularly grade EB-11 which is processed to provide good adhesive characteristics. Other polyesters include those available from ICI under the trademark Melinex 377 which is also an oriented PET, but less preferred than EB-11 because of somewhat lower adhesion properties. Both of the foregoing PET films are biaxially oriented to a mild degree so as to provide yields at 14,000-15,000 psi stress and elongation at break of 150 percent. Other useful polymeric films for reinforcing bands may include the polyamides (nylon); sulfones and films comprising polycarbonate resins; polyvinylidene chloride (saran); polyvinylidene fluoride, films comprising polychlorotrifluoroethylene, as well as cellulose films, and more specifically regenerated cellulose films, to name but a few.

One preferred reinforcing band for the casings of this invention comprises a base strip formed from the above polymeric films which is precoated with a suitable heat sealable adhesive. One group of suitable heat sealable adhesives are the saran polymers disclosed in U.S. Pat. No. 4,610,742. When coated on regenerated cellulose casing, for example, the saran heat sealable adhesive provides a very adherent bond which is able to withstand all environmental stresses while providing a strong bond. While the methods and materials disclosed by U.S. Pat. No. 4,610,742 for splicing together cut ends of two casing units neither teach nor suggest the use of narrow strips for reinforcing bands according to the present invention for reasons discussed above, the general description of the saran polymers, the saran coated cellulose backing film and methods of heat sealing as described therein are incorporated-by-reference herein.

In addition to cellulose as a base strip, casing reinforcing bands may also be prepared from the other previously identified polymeric films and precoated with saran sealable polymeric films or other hot melt adhesives. These other polymeric films may also be preferred over cellulose in some instances because they would be less affected by excessive moisture. In addition, films comprising the polyester PET have demonstrated they can meet the requirements of 20% rapid stretch and 6% maximum residual stretch. Elongation data for the other films indicate that several may equal PET in this respect.

Hot melt adhesives, like saran have the important advantage of rapid set up which is a significant economic factor particularly in high volume manufacturing of banded casing. The bands perform as carriers for the heat sealable adhesive promoting the formation of their uniform bonds also with necessary flexibility.

The present invention also contemplates the use of hot melt adhesives, such as solid saran polymers per se in the fabrication of reinforcing bands, i.e. without polymeric base strip. Saran polymers are especially suitable for this embodiment because of their adaptability to heat sealing methods which not only yield strong reliable bonds, but also because of their approved status as food grade films. The expressions "saran polymer" and "saran adhesive" as used herein are intended to include a family of known thermo-plastic resins, vis vinylidene chloride homopolymer and copolymers of vinylidene chloride with at least one other monomer, such as vinyl chloride, acrylonitrile, acrylates, methacrylates, and their lower alkyl esters, e.g. methyl, ethyl, vinyl acetate, etc. Copolymers of vinylidene chloride with other monomers are generally described in terms of the weight ratio of the monomer units in the copolymer. Saran preferably has at least about 50 percent vinylidene chloride. However copolymers containing as little as 10 percent vinylidene chloride are also included within this term in accordance with the present invention.

In addition to heat sealed saran coatings, that is, coatings of crystalline polyvinylidene chloride or other saran type polymers for bonding reinforcing strips to the casings as disclosed herein, liquid or paste adhesives may be applied to the polymeric supporting base or the surface of the casing where the strips are to be applied. The following representative examples of liquid adhesives have been found to provide generally reliable bonds for the reinforcing bands: high temperature resistant cyanoacrylates, such as those available from the Dexter Corp., Pittsburgh, Calif. under the trademark Superdrop 3ST-5 and from Loctite, Inc., Newington, Conn., under the trademark Superbonder 498. A further representative example of a group of liquid adhesives found to be generally useful are some urethane types, like that available from Lord Corporation, Erie, Pa., under the trademark Tyrite HG 7650. These cyanoacrylates and polyurethane adhesives are especially noteworthy because of their ability to withstand high temperatures normally associated with processing meat and sausage products. The cyanoacrylates have suitably fast set up times for volume production, but the polyurethane adhesives do not. This problem can be solved by covering the bands with masking tape of sufficient width to hold the bands onto the casing and to shield adhesive overflow. Subsequent reeling of the banded casing will hold the polyurethane bonded band firmly in place for the extended cure period.

As mentioned above, saran polymers are not only useful as adherent coatings for bonding strips to casings in forming the reinforcing bands of this invention, but this invention also contemplates certain polymers of which saran polymers and adhesives, like polyvinylidene chloride are representative, to be used alone to form reinforcing rings. That is to say, the present invention contemplates the application of a strip or coating containing a saran polymer which permits the elimination of a support or base polymeric film strip. For instance, a strip of commercially available saran film having the dimensions disclosed above might be wound coaxially around the periphery of a casing in the reinforcing zone and sealed by application of heat and pressure. This provides an especially convenient and economic means for achieving the objectives of this invention.

In fabricating the casing reinforcing rings 36 with adhesive coating 40, for example, reinforcing strips can be wound circumferentially around the exterior surface 20 of the casing so the bands are coaxial with the longitudinal axis of the tubular body, as best illustrated by FIG. 2. The length of the band is essentially the same as the periphery of the casing in the attachment zone. In applying the bands to the casing the ends of the band are formed into a lap seal 50 where one end of the band is sealed on top of the other. Reinforcing bands are preferably applied to casing after leaving the dryer and reeler and before premoisturizing to levels of moisture suitable for stuffing. It has been found that peel strengths of the reinforcing bands from the casing, in some instances, can be enhanced by reducing the level of polyol plasticizer in the casing to levels somewhat below those customarily employed in casings.

In using the novel sausage casings of this invention reference should now be made to FIGS. 7-13 which illustrate diagrammatically a sequence of steps which may be performed in preparing dimensionally uniform stuffed meat products with flat ends. A length of large size casing 52 having reinforcing bands 54, 56 bonded to the exterior wall proximate to each end is severed from a continuous casing having multiple repeating lengths. The initial step requires installation of a first circular end plate 58 in the interior of casing 52 adjacent to reinforcing band 54. First end plate 58, a rigid and essentially flat metal disk is positioned on the forward side of sizing ring 60, both of which are in a plane normal to the longitudinal axis of translatable stuffing horn 62 located on the aft side of sizing ring 60. Loading casing 52 onto stuffing horn 62 may be performed manually, or mechanically with two or more high friction elastomeric shirring rolls 64, 66 preferably with smooth surfaces for greater contact area which engage the casing against a low friction shirring collar 68.

Figure 8:
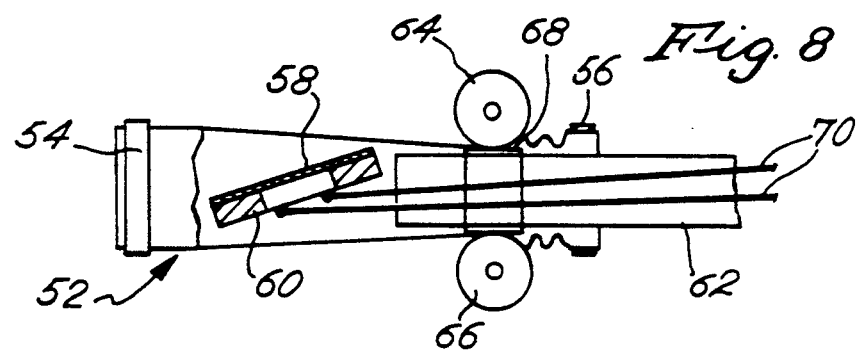
Figure 9:
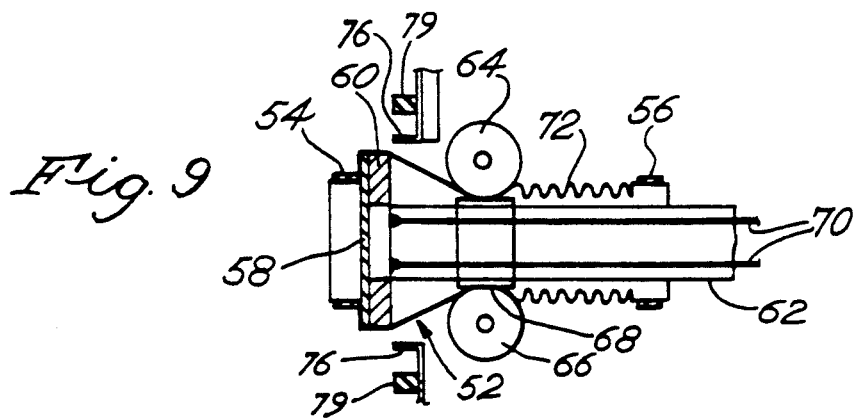
Figure 10:
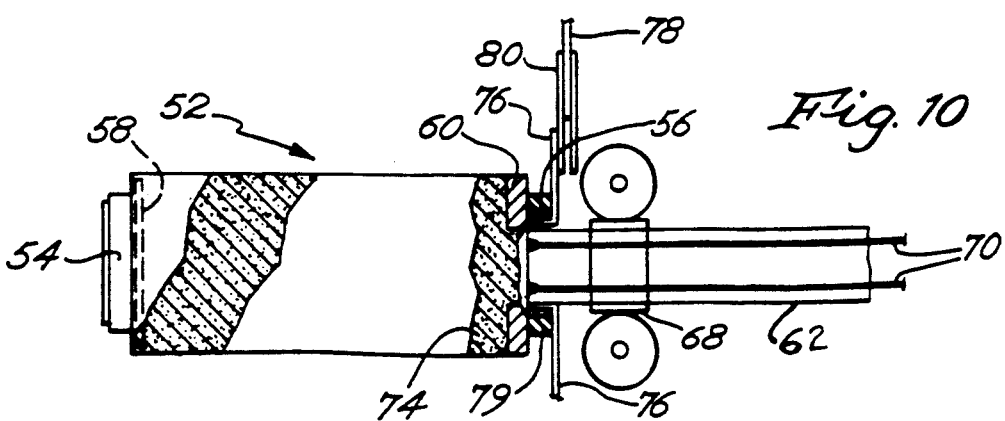

However, because first end plate 58 has a larger diameter than the unstretched casing 52, the casing is cross-sectionally shaped into an oval configuration by an internal carrier mechanism known in the art (FIG. 8). Sizing ring 60 and first end plate 58 are repositioned from an upright normal plane (FIG. 7) to a tilted plane (FIG. 8) by means of control rods 70. By tilting end plate 58 the clearance needed for moving the end plate with the sizing ring into the casing, is made possible. The aft end of the casing is drawn through shirring rolls 64, 66 and shirring collar 68 on horn 62 to form multiple low density soft casing pleats 72. FIG. 9 shows circular end plate 58 flush against the forward end of casing 52 and compressed against reinforcing band 54 bonded to the exterior side of the casing.

Figure 11:
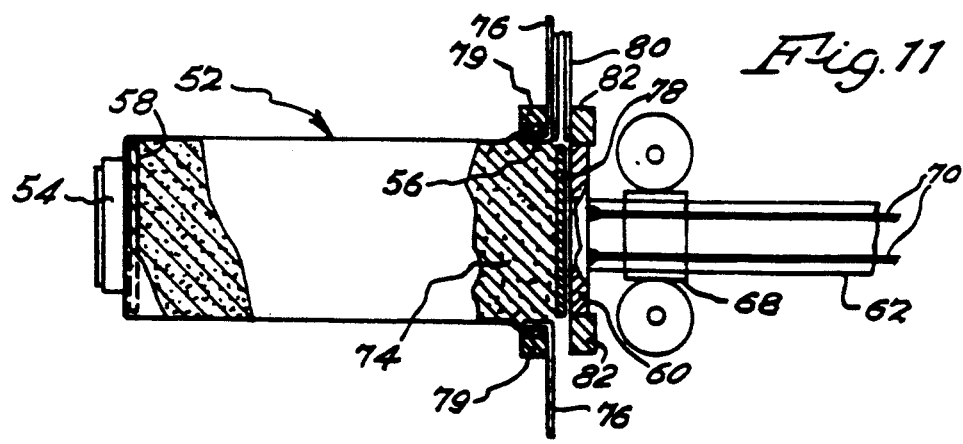
Figure 12:
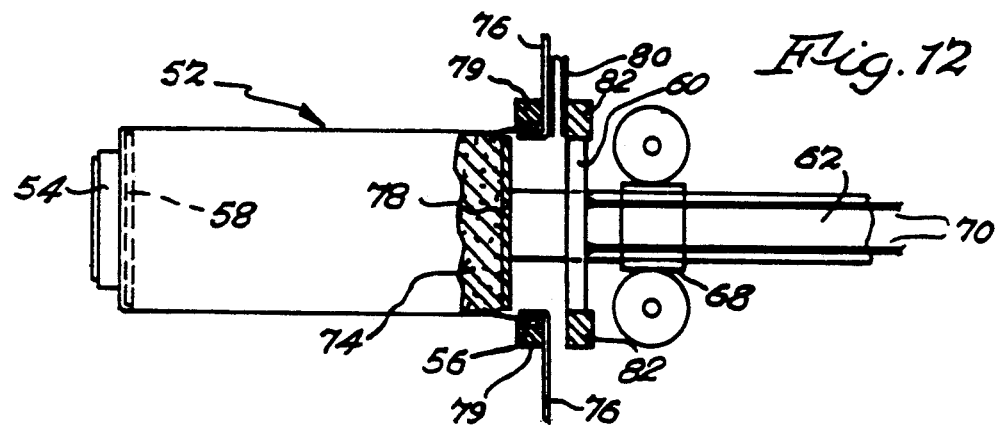
Figure 13:
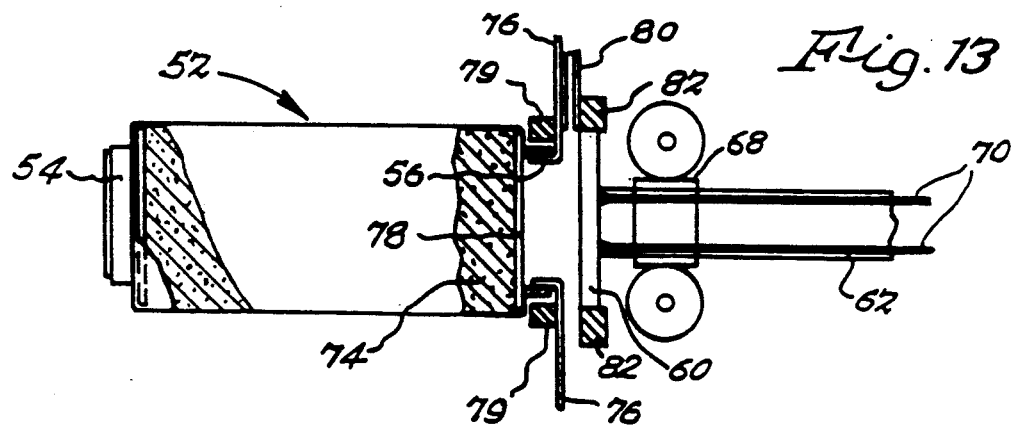

The meat pump (not shown) of the stuffing apparatus is then actuated to initiate the stuffing step in order to fill casing 52 with meat emulsion 74, or other foodstuff. The filling step continues until reinforcing band 56 at the aft end of casing 52 makes contact with the aft side of sizing ring 60. By the sizing ring moving aft, the interior edge of the casing having reinforcing band 56 bonded thereto, but on the opposite outside surface, is placed over a set of expandable fingers 76 which move outwardly to stretch band 56 (FIG. 11). Band 56 is stretched to a diameter which is large enough to permit withdrawal of sizing ring 60 from the aft end of the filled casing (FIG. 11). Expandable fingers 76 are also equipped with elastomeric ring 79 which engages with the outer surface of band 56 to enhance the holding force on the casing, otherwise axial forces generated during the filling step may cause the casing to be drawn from the fingers. Furthermore, the elastomeric ring helps maintain uniform stretch of the band and helps prevent breakage.

The step shown by FIG. 11 may allow a minor amount of meat emulsion to follow the sizing ring due to pressure exerted by the stretched casing. However, a second end plate 78 is immediately delivered from an end plate magazine (not shown) through normally closed elastomer sealed slot 80 to the forward side of sizing ring 60 scraping the meat from the forward side of the sizing ring. Ring 82 defines a chamber into which sizing ring 60 retracts sealing the peripheral edge of ring 6 to prevent meat loss. Translatable stuffing horn 62 then advances (FIG. 12) pushing second circular end plate 78 past expandable fingers 76 and reinforcing band 56 thereby returning any discharged emulsion to the casing and repressurizing the aft end of the filled package. Expandable fingers 76 are then contracted to release reinforcing band 56 (FIG. 13) to form a fully encased self contained sausage product ready for further processing, e.g. smoking and cooking.

Although the invention has been described in considerable detail with respect to the preferred embodiments thereof, it will be apparent that the invention is capable of numerous modifications and variations to those skilled in the art without departing from the spirit and scope of the invention, as defined in the appended claims.

We claim:

1. A food casing, for preparing a stuffed food product having at least one terminal end zone with a diameter equivalent to the given diameter of the major portion of the stuffed food product, which comprises a tubular food casing body with interior and exterior surfaces, first and second terminal ends, and reinforcing means for controlling radial stretching of said food casing at a terminal end thereof to a diameter less than said given diameter, said reinforcing means including at least one casing reinforcing band disposed coaxially around said tubular food casing body proximate to said terminal end and bonded onto said exterior surface of said food casing body.

2. The food casing of claim 1 wherein said tubular body is a member selected from the group consisting of large size cellulose casing and fibrous cellulose casing.

3. The food casing of claim 1 wherein said casing body comprises a predetermined length of casing; and wherein said reinforcing means includes a first casing reinforcing band affixed to said exterior surface of said tubular body proximate to said first end, and a second casing reinforcing band affixed to said exterior surface of said tubular body proximate to said second end to form a casing unit.

4. A food casing comprising a plurality of individual casing units according to claim 1 in a continuous length.

5. The continuous length of food casing of claim 4 wherein said reinforcing means includes casing reinforcing bands of sufficient width to overlap adjacent leading and trailing casing units of the same continuous casing length, said casing units being adjoined to one another prior to bonding said reinforcing bands onto said exterior surface of said food casing body.

6. The continuous length of food casing of claim 5 wherein the reinforcing bands are double bands scored circumferentially.

7. A food casing comprising a plurality of individual repeating casing units in a continuous length, each said casing unit comprising a tubular body with interior and exterior surfaces, first and second terminal ends, said casing reinforcing band disposed coaxially around said tubular body proximate to a terminal end and bonded to said exterior surface, each said casing unit having a first casing reinforcing band and a second casing reinforcing band, said repeating casing units have a gap between each second casing reinforcing band of a leading casing unit and the first casing reinforcing band of the adjacent trailing casing unit.

8. The continuous length of food casing of claim 7 wherein a further length of casing is spliced to the casing in the gap between leading and trailing casing units.

9. The continuous length of food casing of claim 7 including a score line on the casing in the gap between leading and trailing casing units.

10. A food casing comprising a plurality of individual casing units in a continuous length, the food casing being wound on a reel, each said casing unit comprising a tubular body with interior and exterior surfaces, first and second terminal ends, and at least one casing reinforcing band disposed coaxially around said tubular body proximate to a terminal end and bonded to said exterior surface.

11. A food casing comprising a plurality of individual casing units in a continuous length, the food casing being folded in a container, each said casing unit comprising a tubular body with interior and exterior surfaces, first and second terminal ends, and at least one casing reinforcing band disposed coaxially around said tubular body proximate to a terminal end and bonded to said exterior surface.

12. A food casing comprising a tubular body with interior and exterior surfaces, first and second terminal ends, and at least one casing reinforcing band disposed coaxially around said tubular body proximate to a terminal end and banded to said exterior surface, said food casing comprising a predetermined length of casing wherein a first casing reinforcing band is affixed to said exterior surface of said tubular body proximate to said first end, and a second casing reinforcing band is affixed to said exterior surface of said tubular body proximate to said second end to form a casing unit, said casing unit being sufficiently stretchable to permit insertion of casing end plates into the interior of said casing for positioning adjacent to said reinforcing bands in a plane normal to the longitudinal axis of said casing while also having sufficient holding strength to restrain the terminal ends of said casing from being drawn over said end plates during and after filling.

13. A method of forming reinforced food casings, which comprises the steps of:
   (a) providing a food casing having a tubular body with interior and exterior surfaces and first and second terminal ends, and
   (b) applying coaxially around said tubular body at least one strip of an adhesive prior to being filled to form a reinforcing band on said casing proximate to at least one of said terminal ends.

14. The method of claim 13 wherein said adhesive is a saran polymer.

15. A food casing, which comprises a tubular body with interior and exterior surfaces, first and second terminal ends, and at least one casing reinforcing band disposed coaxially around said tubular body proximate to a terminal end and bonded to said exterior surface, said at least one casing reinforcing band being comprised of a material selected from the group consisting of cords and filaments.

16. The food casing of claim 15 wherein said cords and filaments are imbedded in a matrix comprising an adhesive.

17. The food casing of claim 15 wherein said cords and filaments are bonded to a polymeric base strip.

18. A food casing, which comprises a tubular body with interior and exterior surfaces, first and second terminal ends, and at least one casing reinforcing band disposed coaxially around said tubular body proximate to a terminal end and bond to said exterior surface, said at least one casing reinforcing band being a preformed strip comprising a polymeric material.

19. The food casing of claim 18 wherein said preformed polymeric strips are bonded to said exterior surface of said casing with an adhesive.

20. The food casing of claim 19 wherein said adhesive bonded preformed strips comprise a polymeric base selected from the group consisting of a polyester, nylon and regenerated cellulose.

21. The food casing of claim 20 wherein said adhesive bonded strips comprise a polyethylene terephthalate base.

22. The food casing of claim 18 wherein said preformed polymeric strips are bonded to said exterior surface of said casing by heat sealing.

23. The food casing of claim 22 wherein said heat sealed preformed strips comprise a polymeric base selected from the group consisting of a polyester, nylon and regenerated cellulose.

24. The food casing of claim 23 wherein said heat sealed polyester strips comprise a polyethylene terephthalate base.

25. The food casing of claim 22 wherein said preformed heat sealed preformed strips comprise a polymeric film base coated with a heat sealable saran polymeric film.

26. The food casing of claim 22 wherein said preformed heat sealed strips are comprised of food casing film having a regenerated cellulose base coated with a heat sealable moisture and vapor barrier saran polymeric film.

27. A method for preparing reinforced food casings, which comprises the steps of:
   (a) providing a food casing having a tubular body with interior and exterior surfaces and first and second terminal ends;
   (b) providing at least one preformed strip of sufficient length to coaxially encircle said casing prior to being filled,
   (c) positioning at least one of said strips coaxially around said tubular body proximate to at least one of said casing terminal ends, and
   (d) bonding said strip to said exterior surface of said casing to form a reinforcing band.

28. The method of claim 27 wherein said casing and strips bonded to said exterior are characterized as being sufficiently stretchable to permit insertion of casing end plates in the interior of said casing for positioning adjacent to said reinforcing bands in a plane normal to the longitudinal axis of said casing while also having sufficient holding strength to restrain the terminal ends of said casing from being drawn over said end plates after said casing is filled.

29. The method of claim 27 wherein said preformed strips comprise a polymeric material.

30. The method of claim 29 including the step of bonding the preformed strip to the exterior surface of said casing with an adhesive.

31. The method of claim 30 wherein said preformed strip comprises a polymer selected from the group consisting of a polyester, nylon and regenerated cellulose.

32. The method of claim 29 including the step of bonding preformed strip to the exterior surface of said casing by heat sealing.

33. The method of claim 32 wherein said preformed heat sealed strip comprises a polymer selected from the group consisting of a polyester, nylon and regenerated cellulose.

34. The method of claim 32 wherein the preformed heat sealed strip comprises a polymeric base coated with a heat sealable saran polymeric film.

35. The method of claim 34 wherein said preformed heat sealed strips are comprised of food casing having a regenerated cellulose base with a heat sealable moisture and vapor barrier saran polymeric film.

36. The method of claim 27 wherein said preformed strips are comprised of a material selected from the group consisting of cords and filaments.

37. The method of claim 27 wherein said preformed strips are comprised of cords embedded in a matrix comprising an adhesive.

38. The method of claim 27 wherein said preformed strips are comprised of cords bonded to a base film strip.

39. A food casing, which comprise a tubular body with interior and exterior surfaces, first and second terminal ends, and at least one casing reinforcing band disposed coaxially around said tubular body proximate to a terminal end and bonded to said exterior surface, said at least one casing reinforcing band being comprised of an adhesive coating.

* * * * *